United States Patent [19]

Arbegast et al.

[11] Patent Number: 5,120,175
[45] Date of Patent: Jun. 9, 1992

[54] SHAPE MEMORY ALLOY FASTENER

[76] Inventors: William J. Arbegast, 8091 S. Estes St.; Joseph H. Armstrong, 8720 S. Ammons St., both of Littleton, Colo. 80123; Brian J. Maclean, 62 Roberts Rd., Daniel, Wyo. 83115-0141

[21] Appl. No.: 730,222

[22] Filed: Jul. 15, 1991

[51] Int. Cl.⁵ .................. F16B 19/08; B23P 11/02; F16D 1/00
[52] U.S. Cl. .................. 411/501; 411/34; 411/504; 411/903; 411/909; 29/447; 29/524.1; 403/408.1; 403/404
[58] Field of Search .............. 411/34–38, 411/500, 501, 504–507, 901, 902, 909; 29/446, 447, 523, 524.1, 525.2

[56] References Cited

U.S. PATENT DOCUMENTS

| | | | |
|---|---|---|---|
| 980,420 | 1/1911 | Hulfish | 411/504 |
| 1,947,906 | 2/1934 | Fine | 411/504 |
| 2,080,220 | 5/1937 | Butter et al. | 41/504 |
| 2,994,933 | 4/1956 | Wolfe | 24/141 |
| 3,740,839 | 6/1973 | Otte et al. | 29/628 |
| 3,762,266 | 10/1973 | Thellmann | |
| 3,848,389 | 11/1974 | Gapp et al. | 52/758 D |
| 4,485,816 | 12/1984 | Krumme | 128/334 R |
| 4,512,699 | 4/1985 | Jackson et al. | 411/368 |
| 4,754,538 | 7/1988 | Stewart, Jr. et al. | 29/447 |
| 4,841,100 | 6/1989 | Ignasiak | 174/138 G |
| 4,985,979 | 1/1991 | Speakman | 29/525.2 |

FOREIGN PATENT DOCUMENTS 777270 11/1980 U.S.S.R. .................. 411/501

Primary Examiner—Neill R. Wilson
Attorney, Agent, or Firm—Dorr, Carson, Sloan & Peterson

[57] ABSTRACT

A fastener having an elongated shank formed of a shape memory alloy, a head at the upper end of the shank, and an annular segment at the lower end of said shank having a deformed cross-sectional shape suitable for insertion into an opening extending through adjacent workpieces. The annular segment has a frusto-conical trained shape that is larger than this opening. The annular segment radially flares from the deformed shape to an approximation of the trained shape when heated above a critical transformation temperature, thereby securing the fastener in place with respect to the workpieces. Alternatively, a sleeve made of a different material (e.g. aluminum) extending over a portion or the entire length of the fastener can be added for improved deformational characteristics, by providing the same frusto-conical shape through axial contraction of the shank.

30 Claims, 4 Drawing Sheets

SHAPE MEMORY ALLOY FASTENER

BACKGROUND OF THE INVENTION

1. Field of the Invention

The present invention relates generally to the field of mechanical fasteners. More specifically, the present invention discloses a fastener or rivet made of a shape memory alloy that will self-deploy when heated above a critical transformation temperature.

2. Statement of the Problem

Conventional riveting (buck and rivet) requires access to both sides of the workpieces. One person holds the rivet in place while a second person deforms the other side of the rivet with an impact device. Conventional riveting results in the workpieces being held together by the two heads of the rivet, without additional compressive loading of the workpieces.

In many situations, it is difficult or impossible to gain adequate access to both sides of the workpieces. In these situations, blind riveting is required. A number of blind rivet designs have been developed in the past. For example, pop rivets are commonly used in installation of suspended ceilings and for joining sheet metal in light-duty applications. However, blind riveting systems for industrial applications are relatively expensive. Blind rivet designs approved by the Department of Defense are typically at least $3 each. The present invention addresses these shortcomings by providing a more cost-effective fastener suitable for blind riveting that will automatically self-deploy when heated.

Examples of a number of different fasteners using shape memory alloys or other materials with memory characteristics are shown in the following prior art references:

| Inventor | Patent No. | Issue Date |
|---|---|---|
| Wolfe | 2,994,933 | Aug. 8, 1961 |
| Otte, et al. | 3,740,839 | June 26, 1973 |
| Thellmann | 3,762,266 | Oct. 2, 1973 |
| Gapp, et al. | 3,848,389 | Nov. 19, 1974 |
| Krumme | 4,485,816 | Dec. 4, 1984 |
| Jackson, et al. | 4,512,699 | Apr. 23, 1985 |
| Ignasiak | 4,841,100 | June 20, 1989 |

Wolfe discloses a plastic grommet made of a material (such as vinyl tubing) having memory characteristics activated by heat. However, the structural limitations of plastic tubing and the shape of the grommet render this design suitable only for light-duty applications.

Otte, et al., disclose a connector having two tines. A metallic band made of a shape memory alloy extends around the tines. The band shrinks when heated, thereby applying a compressive force on the tines to grip an object (such as a wire) held between the tines.

Thellmann discloses a bimetal fastener. The bottom portion of the fastener shank is made of a relatively soft metal to permit the fastener to be readily deformed by manual means.

Gapp, et al., disclose another bimetal fastener having a ductile bottom end and a harder titanium alloy shank. The bottom of the fastener is deformed by manual means.

Krumme discloses a surgical staple made of a shape memory alloy.

Jackson, et al., disclose a daze fastener system in which the bottom portion of the fastener has a frusto-conical shape. The workpieces to be joined together have corresponding frusto-conical apertures to accept the fastener. The purpose of this system is to compensate for mismatches in the coefficient of thermal expansion between the materials being joined.

Ignasiak discloses a retainer post having an internal cavity containing a material (such as a shape memory alloy) that expands when heated. Expansion of this material causes radial expansion of the lower end of the retainer post, thereby holding the post in place with respect to the surrounding hole.

3. Solution to the Problem

None of the prior art references discloses a fastener made of a shape memory alloy having the configuration or blind riveting applications described herein.

SUMMARY OF THE INVENTION

This invention discloses a fastener having an elongated shank formed of a shape memory alloy, a head at the upper end of the shank, and an annular segment at the lower end of said shank having a deformed cross-sectional shape suitable for insertion into an opening extending through adjacent workpieces. The annular segment has a frusto-conical trained shape that is larger than the opening. The annular segment radially flares from the deformed shape to an approximation of the trained shape when heated above a critical transformation temperature, thereby securing the fastener in place with respect to the opening in the workpieces. In other embodiments, a sleeve made of a different material (e.g. aluminum) extending over a portion or the entire length of the fastener can be added for improved deformational characteristics, by providing the same frusto-conical shape through axial contraction of the shank.

A primary object of the present invention is to provide a fastener that will self-deploy simply by heating the fastener.

Another object of the present invention is to provide a fastener suitable for blind riveting, i.e. where the reverse side of the workpieces is inaccessible.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Shape memory alloys have the characteristic of retaining a memory of a previously "trained" shape. The alloy can be deformed, but will return to the trained shape when heated above a critical transformation temperature, $T_c$. This is accomplished by a thermally-activated, reversible martensitic-austenitic phase transformation in the crystalline structure of the alloy. In particular, shape memory alloys are typically used in the following manner:

(a) A part (e.g., a wire) made of the shape memory alloy is formed by conventional means (e.g., a jig) into the desired trained shape.

(b) The part is held in the trained shape during a short annealing period in which the temperature is raised above the critical transformation temperature, $T_c$. After annealing the alloy has an austenitic structure.

(c) The part is cooled below the critical transformation temperature, resulting in a martensitic structure for the alloy.

(d) The part can then be deformed by conventional means into a second, "deformed" shape while maintaining the temperature below the critical transformation temperature. A significant amount of deformation can be accommodated, often reaching in excess of 8%. This results in a deformed martensitic structure for the alloy.

(e) The part is then heated to a temperature above the critical transformation temperature by a heater or by ambient conditions. This causes the alloy to return to an austenitic crystalline structure, and to return from the deformed shape to an approximation of the trained shape.

A number of shape memory alloys are commercially available, including Raychem K-alloy (Ti-Ni-Cu) and nitinol (Ni-Ti). Other shape memory alloys, such as copper-aluminum-nickel, copper-zinc-aluminum, and titanium-cobalt-nickel, are also known in the art. At cryogenic temperatures, an alloy such as iron-doped or chromium-doped Ni-Ti can be employed.

Figure 1A:
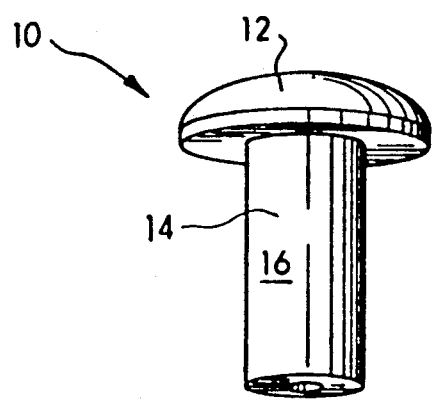
FIGS. 1a and 1b are perspective views of a fastener made of a shape memory alloy in which the temperature of the fastener is respectively below (FIG. 1a) and above (FIG. 1b) the transformation temperature.
Figure 1B:
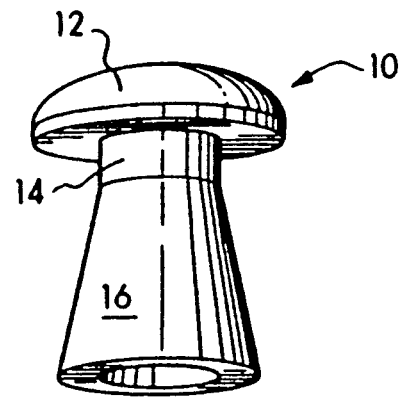
Figure 3A:
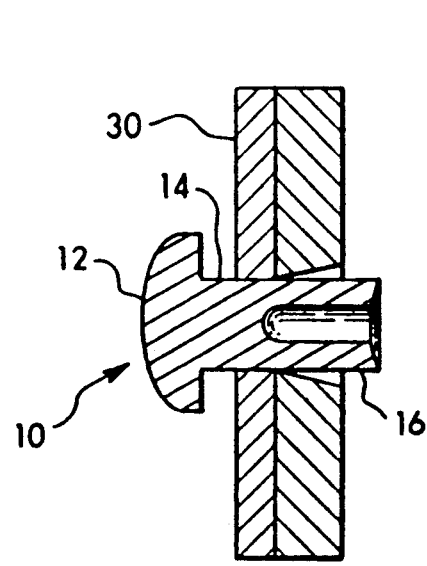
FIGS. 3a and 3b are simplified cross-sectional views showing installation of the fastener.
Figure 3B:
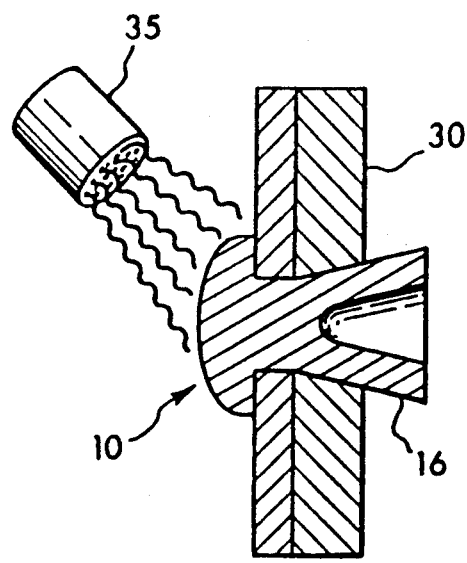

Turning to FIGS. 1(a) and (b), perspective views of the simplest embodiment of the present invention are shown. In this embodiment, the fastener 10 is formed from a unitary piece of shape memory alloy having a head 12, an elongated shank 14, and an annular segment 16. As shown in FIGS. 1(a) and 3(a), the fastener has a deformed shape with substantially cylindrical shank 14 and annular segment 16. In this state, the cross-sectional dimensions of the shank 14 and annular segment 16 are sufficiently small to permit the shank 14 and annular segment 16 of the fastener 10 to be inserted into the opening extending through the adjacent workpieces 30 to be fastened together, as shown in FIG. 3(a). The head 12 of the fastener 10 provides a predetermined maximum depth of insertion of the fastener 10 in the opening. The trained shape of the fastener is shown in FIGS. 1(b) and 3(b). After the fastener 10 is inserted in the opening, it is heated by a heater 35 to a temperature above the critical transformation temperature, $T_c$, for the shape memory alloy. Alternatively, if the alloy has a cryogenic transformation temperature, this heating can be accomplished simply by allowing the fastener to warm to ambient conditions. This causes the annular segment 16 to flare radially outward toward a frusto-conical shape with dimensions at least as large, and preferably larger than the opening in the workpieces 30, as shown in FIG. 3(b), thereby securing the fastener 10 in the opening.

Figure 2A:
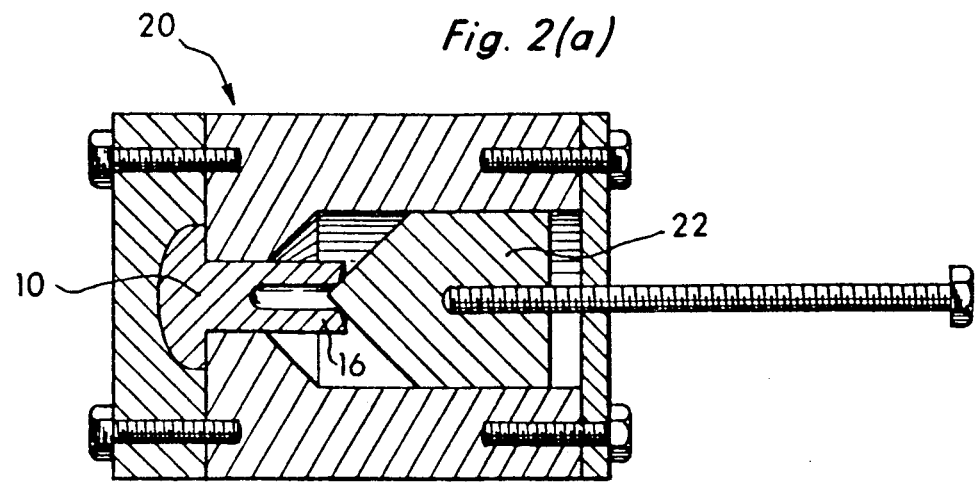
FIGS. 2a through 2c are simplified cross-sectional views of a fastener and the jig assembly used to train and deform the fastener prior to installation.
Figure 2B:
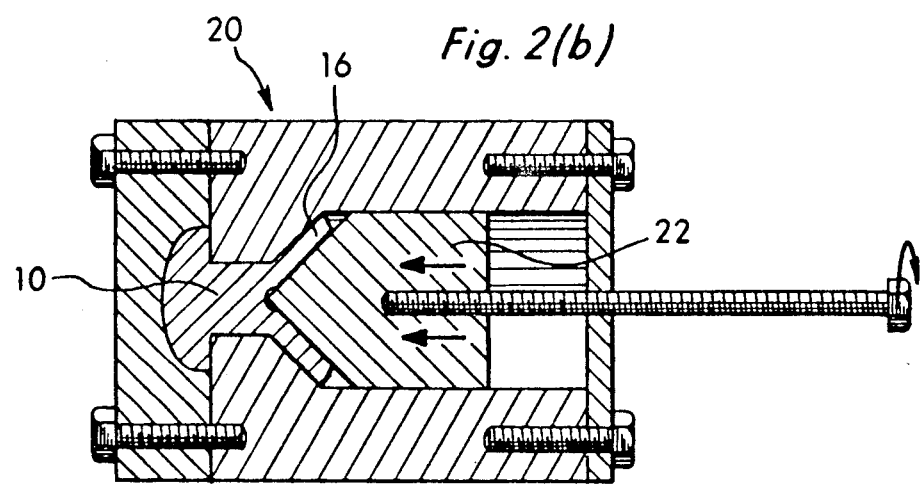
Figure 2C:
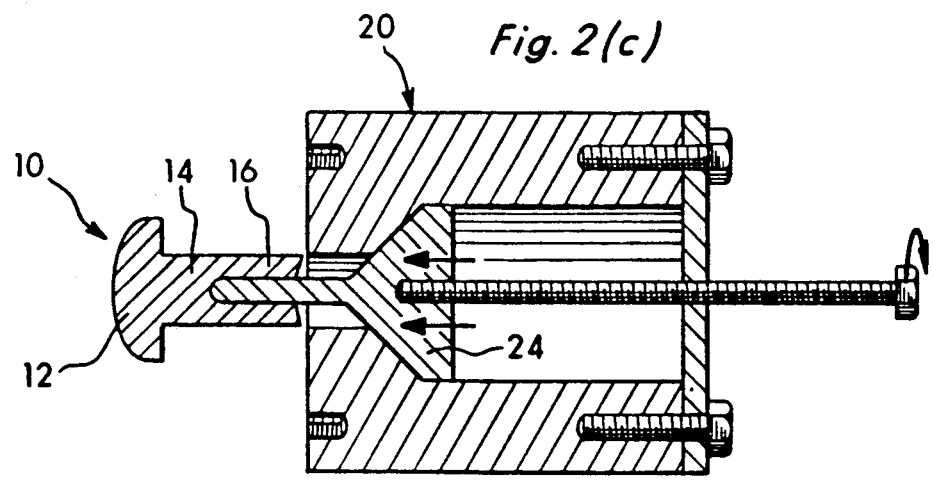

FIGS. 2(a) through (c) show one possible method of fabricating and training the fastener using a jig. A blank for the fastener 10 is first formed by conventional molding, forging, or machining techniques. The shank 14 of the fastener 10 initially has a substantially cylindrical shape to simplify initial fabrication. The annular segment 16 at the lower end of the shank also has a cylindrical void extending axially upward from its lower end toward the head 12 of the fastener 10. The fastener 10 is positioned in the jig 20 as shown in cross-section in FIG. 2(a). A screw assembly advances a conical training die 22 in the jig 20 toward the lower end of the fastener 10, as shown in FIG. 2(b), which deforms the annular segment into a substantially frusto-conical shape, as shown in FIG. 2(b), which is preferably larger than the corresponding shape of the workpiece opening (compare FIGS. 2(b) and 3(b)). While the fastener 10 remains in this trained shape (FIG. 2(b)), the jig 20 is subjected to an annealing process in which the fastener 10 is heated to a temperature above the critical transformation temperature, $T_c$, for the shape memory alloy. This elevated temperature results in an austenitic crystalline structure for the alloy. The jig is then cooled to a temperature below the critical transformation temperature, causing a martensitic transformation in the crystalline structure.

As an alternative to the steps shown in FIGS. 2(a) and 2(b) can be combined if the fastener is directly formed in the trained shape by forging, or by conventional near-net formation using powder metallurgy, provided the fastener is subjected to temperatures in excess of the critical transformation temperature and then subsequently cooled to cause a martensitic transformation. Either of these approaches may be more appropriate for mass production of fasteners than the steps shown in FIGS. 2(a) and 2(b).

Returning to FIG. 2(c), the training die 22 is removed after the annealing process is complete, and replaced with a knock-out die 24. The knock-out die 24 forces the fastener 10 out through the hole in the left end of the jig 20. As the fastener 10 passes through this hole, the annular segment 16 undergoes plastic deformation from its frusto-conical trained shape into a substantially cylindrical shape. Throughout this step, the temperature remains below the critical transformation temperature, thereby resulting in a deformed martensitic crystalline structure for the fastener. The resulting fastener 10 can be transported and/or stored for an indefinite period of time provide its temperature never exceeds the critical transformation temperature for the shape memory alloy.

FIGS. 3(a) and 3(b) demonstrate installation of the fastener 10 in the workpieces 30. The fastener is manually inserted in a preformed opening of appropriate dimensions extending through the workpieces, and then heated by means of a conventional heater 35 (or by ambient conditions for alloys with cyrogenic transformation temperatures) to a temperature above the critical transformation temperature. This causes the fastener 10 to revert from its deformed martensitic state to an austenitic crystalline state, and causes the annular segment 16 to flare radially outward from its deformed cylindrical shape to an approximation of its frusto-conical trained shape (i.e. the trained shape). The dimensions and shape of the opening through the workpieces 30 preferably correspond to the deformed and trained shapes of the fastener 10. In particular, the cross-sectional dimensions of the annular segment 16 and shank 14 of the fastener 10 in its deformed shape must be sufficiently small to permit insertion into the opening in the workpieces. The head 12 of the fastener 10 is typically large enough to provide a predetermined maximum limit for insertion of the fastener 10 into the opening. In addition, the trained shape of the annular segment 16 must be sufficiently large to effectively lock the fastener 10 in place with respect to the workpieces 30. This is typically accomplished by using a shank that is long enough to cause the annular segment 16 to extend substantially through the opening to the opposite side of the workpieces 30. Alternatively, the sides of the opening can be tapered radially outward as shown in FIGS. 3(a) and 3(b) to match the contour of the trained shape of the annular segment 16.

The shank 14 of the fastener 10 can also be trained, in addition to the annular segment 16. For example, the shank 14 can be trained to provide axial contraction and/or radial expansion by means of the training process outlined above. Radial expansion of the shank 14 can be used to seal the opening in the workpieces 30, and axial contraction is beneficial in ensuring compressive loading of the workpieces 30 between the head 12 and annular segment 16 of the fastener 10.

Figure 4A:
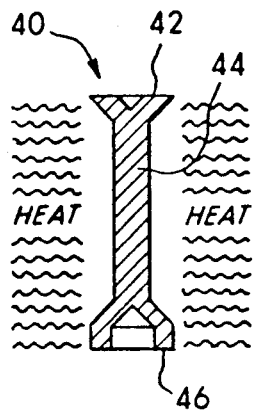
FIGS. 4a through 4f simplified cross-sectional views of an alternative embodiment of the present invention in which a fastener is formed by inserting a shank of shape memory alloy in an aluminum sleeve.
Figure 4B:
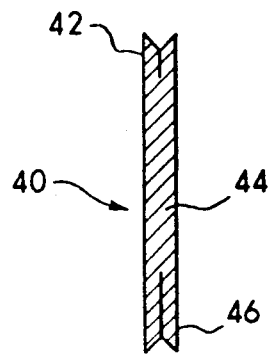
Figure 4C:
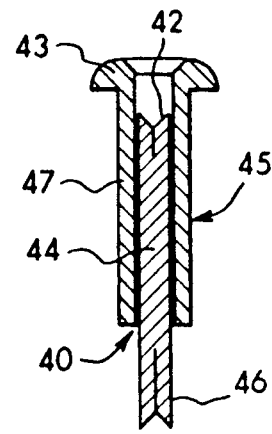
Figure 4D:
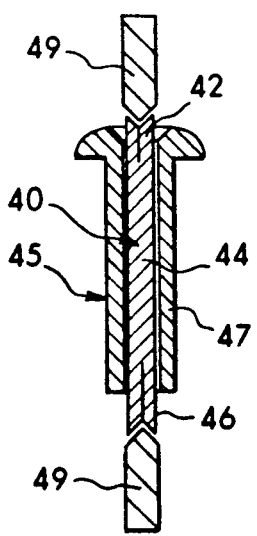
Figure 4E:
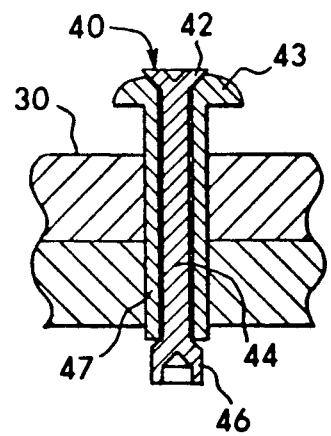
Figure 4F:
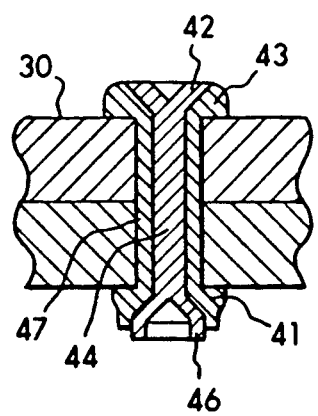

FIGS. 4(a) through 4(f) show an alternative embodiment of the present invention in which a sleeve 45, made of a material such as aluminum, is added to enhance the deformational characteristics of a fastener core 40 made of a shape memory alloy. Axial contraction of the fastener core results in deformation of the lower end of the sleeve 41 into a frusto-conical shape to deploy the fastener. As shown in FIG. 4(a), the fastener core 40 is formed by conventional means into a trained shape having an upper head 42, a central elongated shank 44, and a lower annular segment 46. For ease of manufacture, both the upper head 42 and lower annual segment 46 can be simultaneously formed by the action of an opposing set of dies with conical faces. The fastener core 40 is then heated to a temperature well above the critical transformation temperature for the shape memory alloy by a heater or by ambient conditions, thereby causing an austenitic transformation in the fastener core 40. The fastener core is then cooled below the critical transformation temperature and the upper head 42 and lower annual segment 46 are deformed to smaller cross-sectional dimensions as shown in FIG. 4(b). The shank 44 is also typically lengthened and reduced in diameter by rolling or pulling. As shown in FIG. 4(c), the fastener core 40 is inserted into a sleeve 45 having a head 43 and tubular shank 47. The head 42 and lower annular segment 46 of the fastener core are deformed by opposing dies 49 as shown in FIG. 4(d) to retain the fastener core 40 within the sleeve 45. The resulting assembly can be easily transported in one piece and stored for an indefinite period of time provided the fastener assembly is maintained at a temperature less than the critical transformation temperature. FIGS. 4(e) and 4(f) demonstrate the manner in which the fastener assembly is deployed in a hole or opening extending through the workpieces 30. The fastener assembly is manually inserted into the opening which preferably is slightly larger than the diameter of the fastener. The length of the fastener (between the head 43 of the sleeve 45 and the top of the lower annular segment 46 of the fastener core 40) preferably is slightly larger than the depth of the hole through the workpieces 30. After insertion through the workpieces 30, the fastener assembly is heated above the critical transformation temperature by a heater or by ambient conditions. This causes the fastener core to return to an approximation of the trained shape shown in FIG. 4(a). Radial expansion and axial contraction of the fastener core 40 causes deformation of the sleeve 45, as shown in FIG. 4(f), substantially filling the opening and placing a compressive loading on the workpieces 30.

Figure 5A:
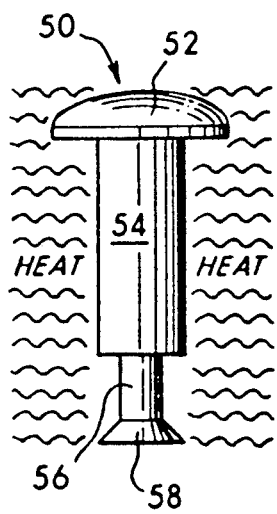
FIGS. 5a through 5e are simplified cross-sectional views of yet another alternative embodiment in which a shank of shape memory alloy is used with a partial aluminum sleeve to form a fastener.
Figure 5B:
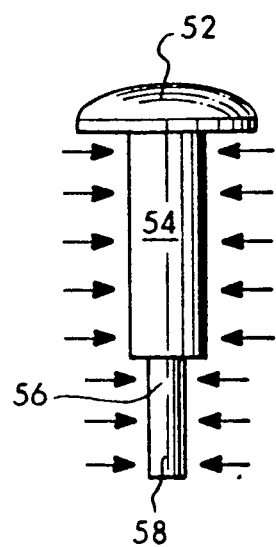
Figure 5C:
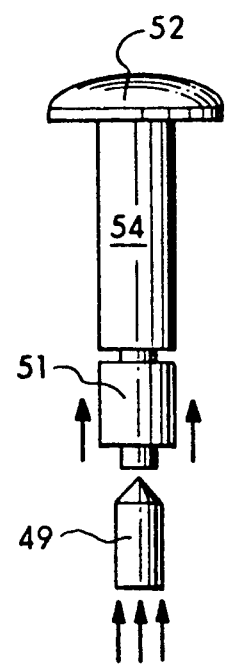
Figure 5D:
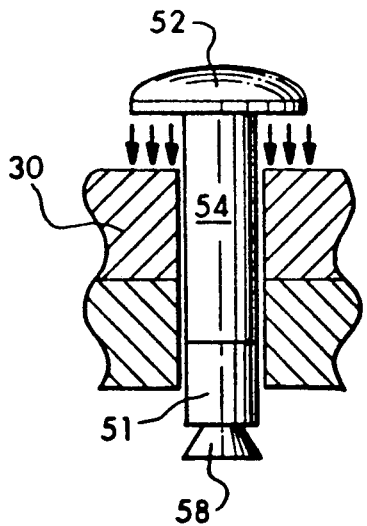
Figure 5E:
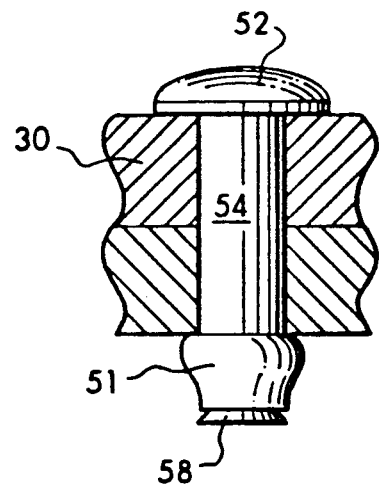

FIGS. 5(a) through 5(e) disclose yet another alternative embodiment of the present invention using only a partial sleeve 51. The fastener 50 is formed of a shaped memory alloy, as generally discussed above. However, the trained shape of the fastener 50 includes a reduced segment 56 at the bottom of the shank 54 with a smaller diameter than the shank 54. The trained shape also includes a frusto-conical retaining segment 58 at the bottom of the reduced segment 56. The fastener 50 is annealed as shown in FIG. 5(a) and allowed to cool below the critical transformation temperature. The the shank 54, reduced segment 56, and retaining segment 58 are deformed (e.g., by rolling) to lengthen their axial dimensions and reduce their radial dimensions as shown in FIG. 5(b). In particular, the cross-section of the retaining segment 58 is reduced sufficiently to permit the annular sleeve or collar 51 to be insert over the retaining segment 58 and onto the reduced segment 56 as shown in FIG. 5(c). After the sleeve 51 is installed, a die 49 is employed to deform the retaining segment 58 to hold the sleeve 51 in place on the reduced segment 56. FIGS. 5(d) and 5(e) demonstrate the manner in which the fastener is deployed in a hole or opening extending through the workpieces 30. The fastener is manually inserted into the opening which preferably is slightly larger than the diameter of the fastener. The length of the fastener shank 54 in its deformed state preferably is approximately equal to the depth of the hole through the workpieces 30. After insertion through the workpieces 30, the fastener assembly is heated above the critical transformation temperature by a heater or by ambient conditions. This causes the fastener to return to an approximation of the trained shape shown in FIG. 5(a). Axial contraction of the shank 54, coupled with radial expansion and axial contraction of the reduced segment 56 and retaining segment 58 cause deformation of the sleeve 51, as shown in FIG. 5(e). This also causes compressive loading on the workpieces 30. Additionally, radial expansion of the shank 54 substantially fills the opening in the workpieces 30.

The above disclosure sets forth a number of embodiments of the present invention. Other arrangements or embodiments, not precisely set forth, could be practiced under the teachings of the present invention and as set forth in the following claims.

We claim:

1. A one-piece fastener integrally formed of a shape memory alloy, adapted for insertion into an opening, said fastener comprising:
   an elongated shank having an upper end and a lower end adapted for insertion into said opening;
   a head at the upper end of said shank adapted to provide a predetermined limit for the maximum depth of insertion of said fastener into said opening; and
   a substantially annular segment extending from the lower end of said shank having a deformed shape suitable for insertion into said opening, and a substantially frusto-conical trained shape larger than said opening; said annular segment flaring radially outward from said deformed shape to an approximation of said trained shape when heated above a critical transformation temperature.

2. The fastener of claim 1, wherein said shape memory alloy is comprised of an iron-doped nickel titanium alloy.

3. The fastener of claim 1, wherein said shape memory alloy is comprised of nickel, titanium, and copper.

4. The fastener of claim 1, further comprising a sleeve extending along at least a portion of said shank and said annular segment of said fastener.

5. The fastener of claim 1, wherein said shank has a deformed cross-sectional shape suitable for insertion of said shank into said opening, and a trained cross-sectional shape larger than said opening, said shank expanding from said deformed shape to an approximation of said trained shape when heated above a critical transformation temperature.

6. A fastener adapted for insertion into an opening having two opposing sides separated by a predetermined thickness, said fastener comprising:
   an elongated sleeve adapted for insertion into said opening, having upper and lower ends and an internal cavity extending axially upward from said lower end;
   an elongated shank made of a shape memory alloy with upper and lower ends, having a deformed cross-sectional shape suitable for insertion into the internal cavity of said sleeve and a trained shape with a shorter length and larger cross-section than said deformed shape, such that heating said shank above a critical transformation temperature results in axial contraction and radial expansion of said shank causing radially expansive deformation of said sleeve; said lower end having a deformed cross-sectional shape suitable for insertion of said lower end and said sleeve into said opening, and a trained shape having a cross-section substantially greater than said deformed shape, such that heating said lower end above a critical transformation temperature results in said lower end causing deformation of an adjacent portion of said sleeve to form a lower head substantially larger than said opening.

7. The fastener of claim 6, further comprising an upper head extending radially outward from the upper end of said sleeve, adapted to provide a predetermined limit for the maximum depth of insertion of said sleeve into said opening.

8. The fastener of claim 7, wherein the length of said shank in its trained state between said upper and lower heads is less than the said thickness.

9. The fastener of claim 6, wherein the upper end of said shank has a deformed cross-sectional shape suitable for at least partial insertion of said upper end into said sleeve, and a trained shape having a cross-section substantially greater than said deformed shape, such that heating said upper end above a critical transformation temperature results in said upper end causing deformation of an adjacent portion of said sleeve to form an upper head substantially larger than said opening.

10. The fastener of claim 9, further comprising a head extending radially outward from an upper portion of said sleeve, adapted to provide a predetermined limit for the maximum depth of insertion of said sleeve in said opening.

11. The fastener of claim 9, wherein the length of said shank in its trained state between said upper and lower heads is less than said thickness.

12. The fastener of claim 6, wherein said shape memory alloy is comprised of an iron-doped titanium nickel alloy.

13. The fastener of claim 6, wherein said shape memory alloy is comprised of titanium, nickel and copper.

14. A fastener adapted for insertion into an opening having two opposing sides separated by a predetermined thickness, said fastener comprising:
   an elongated shank made of a shape memory alloy with upper and lower ends, adapted for insertion into said opening;
   a head at the upper end of said shank, adapted to provide a predetermined limit for the maximum depth of insertion of said fastener in said opening;
   a reduced segment made of a shape memory alloy extending from the lower end of said shank; and
   an annular collar adapted to fit over at least a portion of said reduced segment; said reduced segment having a deformed shape with cross-sectional dimensions such that said collar and said reduced segment can be inserted through said opening, and a trained shape with a cross-section substantially greater than said deformed shape, such that heating said reduced segment above a critical transformation temperature results in said reduced segment causing radial expansion and deformation of said collar to form a lower head substantially larger than said opening.

15. The fastener of claim 14, further comprising a retaining segment at the lower end of said reduced segment, adapted to retain said collar on said reduced segment in its deformed shape.

16. The fastener of claim 14, wherein said shank has a trained shape with a shorter length than said deformed shape, such that heating said shank above a critical transformation temperature results in axial contraction of said shank.

17. The fastener of claim 14, wherein said shank has a trained shape with a larger cross-section than said deformed shape, such that heating said shank above a critical transformation temperature results in radial expansion of said shank.

18. The fastener of claim 14, wherein the deformed shape of said shank is substantially equal to said thickness.

19. A method of fastening together a plurality of workpieces having an opening extending therethrough, said method comprising the following sequence of steps:
   forming a fastener made of a shape memory alloy into a predetermined trained shape and heat treating said fastener to a temperature above the critical transformation temperature for said shape memory alloy, said trained shape having:
      (a) an elongated shank having an upper end and a lower end adapted for insertion into said opening; and
      (b) an expandable portion at the lower end of said shank having a cross-sectional shape larger than said opening;
   cooling said fastener in said trained shape to a temperature below said critical transformation temperature;

deforming the expandable portion of said fastener into a deformed shape having a cross-sectional shape suitable for insertion into said opening;

inserting said fastener in its deformed state into said opening; and heating said fastener to a temperature above said critical transformation temperature, thereby causing said lower portion of said fastener to transform from said deformed shape to an approximation of said trained shape.

20. The method of claim 19, wherein said fastener further comprises a head at the upper end of said shank adapted to provide a predetermined limit for the maximum depth of insertion of said fastener in said opening.

21. The method of claim 19, wherein said fastener further comprises a sleeve extending along at least a portion of said shank.

22. The method of claim 19, wherein said expandable portion has a substantially cylindrical deformed shape, and a substantially frusto-conical trained shape.

23. The method of claim 19, wherein said shank has a deformed cross-sectional shape suitable for insertion of said shank into said opening, and a trained cross-sectional shape larger than said opening, said shank expanding from said deformed shape to an approximation of said trained shape when heated above said critical transformation temperature.

24. A method of fastening together a plurality of workpieces having an opening extending therethrough, said method comprising the following sequence of steps:

forming a fastener made of a shape memory alloy into a predetermined trained shape and heat treating said fastener to a temperature above the critical transformation temperature for said shape memory alloy, said trained shape having:

(a) an elongated shank having an upper end and a lower end;

(b) a lower annular segment extending from the lower end of said shank having a cross-sectional shape larger than said shank; and (c) an upper annular segment extending from the upper end of said shank having a cross-sectional shape larger than said shank;

cooling said fastener in said trained shape to a temperature below said critical transformation temperature;

deforming at least one of said annular segments into a deformed shape having a smaller cross-section than its trained shape;

inserting said fastener in its deformed state into an elongated annular sleeve adapted to receive said shank and said deformed annular segment;

deforming said deformed annular segment into a shape having a cross-section sufficiently large to retain said fastener within said sleeve;

inserting said fastener into said opening; and heating said fastener to a temperature above said critical transformation temperature, thereby causing said lower annular segment to transform from said deformed shape to an approximation of its trained shape, and thereby causing deformation of at least a portion of said sleeve to a shape larger than said opening.

25. The method of claim 24, wherein said sleeve further comprises a head adjacent to said upper annular segment adapted to provide a predetermined limit for the maximum depth of insertion of said fastener, in said opening.

26. The method of claim 24, wherein said lower annular segment has a substantially cylindrical deformed shape, and a substantially frusto-conical trained shape.

27. The method of claim 24, wherein said shank has a deformed cross-sectional shape suitable for insertion of said shank into said sleeve, and substantially larger cross-sectional dimensions in its trained shape, said shank expanding from said deformed shape to an approximation of said trained shape when heated above said critical transformation temperature, thereby causing radial expansion of said sleeve.

28. A method of fastening together a plurality of workpieces having an opening extending therethrough, said method comprising the following sequence of steps:

forming a fastener made of a shape memory alloy into a predetermined trained shape and heat treating said fastener to a temperature above the critical transformation temperature for said shape memory alloy, said trained shape having:

(a) an elongated shank having an upper end and a lower end;

(b) a head at the upper end of said shank, adapted to provide a predetermined limit for the maximum depth of insertion of said fastener in said opening;

(c) a reduced segment extending from the lower end of said shank having cross-section dimensions smaller than said shank; and (d) a retaining segment at the lower end of said reduced segment, having a cross-sectional dimensions larger than said reduced segment;

cooling said fastener in said trained shape to a temperature below said critical transformation temperature;

deforming said retaining segment and said reduced segment to smaller cross-sectional shapes;

inserting the retaining segment and the reduced segment of said fastener through an elongated annular sleeve adapted to receive said reduced segment;

deforming said retaining segment into a cross-sectional shape sufficiently large to retain said sleeve on said reduced segment;

inserting said fastener into said opening; and heating said fastener to a temperature above said critical transformation temperature, thereby causing said reduced segment and said retaining segment to transform from said deformed shapes to an approximation of their trained shapes, and thereby causing radial expansion of at least a portion of said sleeve to a shape larger than said opening.

29. The method of claim 28, wherein said retaining segment has a substantially frusto-conical trained shape.

30. The method of claim 28, wherein said shank has a deformed cross-sectional shape suitable for insertion of said shank into said sleeve, and a trained cross-sectional shape larger than said opening, said shank expanding from said deformed shape to an approximation of said trained shape when heated above said critical transformation temperature.

* * * * *